J. KREMENEZKY & J. JELLINEK.
MACHINE FOR PRODUCING BEADS ON GLASS RODS.
APPLICATION FILED JAN. 26, 1914.

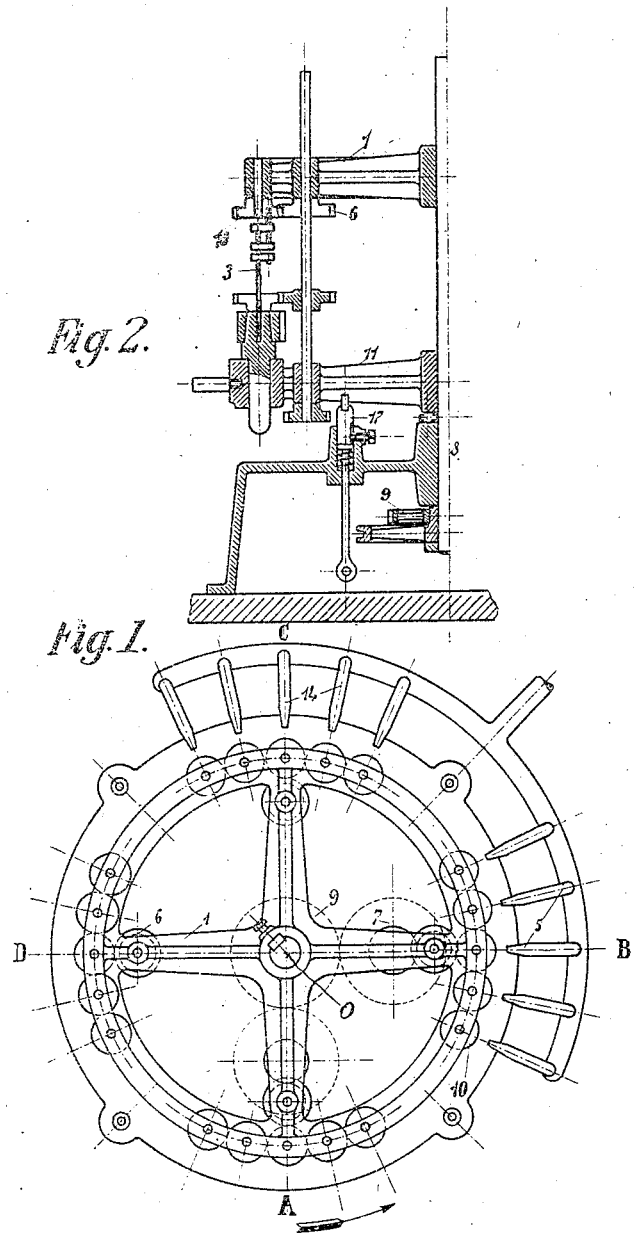

1,117,060.

Patented Nov. 10, 1914.
2 SHEETS—SHEET 2.

UNITED STATES PATENT OFFICE.

JOHANN KREMENEZKY AND JOSEF JELLINEK, OF VIENNA, AUSTRIA-HUNGARY, ASSIGNORS TO THE FIRM OF JOHANN KREMENEZKY, OF VIENNA, AUSTRIA-HUNGARY.

MACHINE FOR PRODUCING BEADS ON GLASS RODS.

1,117,060.   Specification of Letters Patent.   Patented Nov. 10, 1914.

Application filed January 26, 1914. Serial No. 814,563.

*To all whom it may concern:*

Be it known that we, JOHANN KREMENEZKY and JOSEF JELLINEK, both subjects of the Emperor of Austria-Hungary, and residents of Vienna, Empire of Austria-Hungary, have invented certain new and useful Improvements in Machines for Producing Beads on Glass Rods; and we do hereby declare the following to be a full, clear, and exact description of the invention, such as will enable others skilled in the art to which it appertains to make and use the same.

This invention relates to a machine for producing beads on glass rods, more particularly on such glass rods as are used in the supporting frames for metal filaments of electric incandescent lamps, the said beads being produced by heating and upsetting the rods arranged in groups in frames all the rods of a group undergoing the same operation simultaneously.

According to the present invention the glass rods are clamped in a frame rotated step by step, the said frame consisting of two parallel wheels rotating together; one of these wheels carries the chucks for holding in position the glass rods while the other wheel carries upsetting frames opposite the chucks, movable in a direction parallel to the axis of the wheels. In order to secure a thorough and uniform heating of those parts of the glass rods which are to be upset for obtaining the beads, the chucks are revolved around the longitudinal axis of the glass rods while they are in the various working positions.

Figure 3:
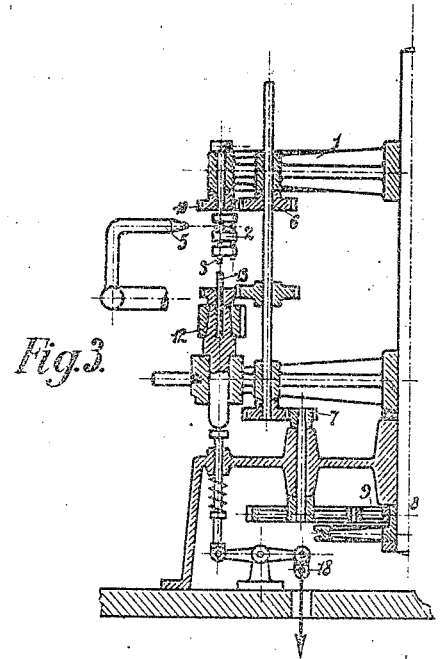
Figure 4:
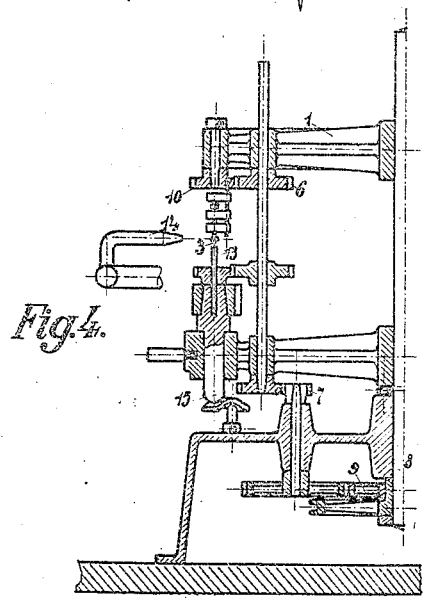

In the drawings Figure 1 is a plan view of those parts of a machine embodying this invention which are required for understanding the latter. Figs. 2, 3 and 4 are radial sections of Fig. 1 on the lines O A, O B and O C respectively.

In a wheel or disk 1 a member of equidistant groups of chucks is mounted, each such group comprising a plurality of individual chucks 2 in which the glass rods 3 are secured by hand so as to be normal to the plane of the wheel 1. A second wheel 11 parallel and clutched to the wheel 1 so as to rotate with this latter wheel carries upsetting frames 12 opposite the groups of chucks and adapted to be reciprocated in a direction normal to its plane.

The movements of the wheels and upsetting frames are preferably derived from a single treadle lever 18 indicated in Fig. 3 in any convenient manner, the arrangement being preferably such that on depressing the treadle first the upsetting frames are raised and then released after the two wheels have started forward through the distance between two adjacent groups of chucks. Upon raising the upsetting frames the heated ends of the glass rods are upset forming beads. At the same time the pawl 17 by depression of the treadle is brought out of engagement with the spoke of the wheel 11, and the wheel has begun to rotate. The pawl 17 then clears the spoke during the rotation of the wheel and the treadle is released, lowering the upsetting frame out of action and returning the pawl to its normal position ready for engagement with the next spoke of the wheel.

The glass rods are secured by hand in the chucks 2 of the groups occupying the position A Fig. 2. After the rods have been secured the attendant depresses the treadle whereby the wheels 1 and 11 are turned through the distance between two adjacent groups of chucks thus bringing the group which had previously occupied the position A into the position B Figs. 1 and 3. In this position in which parts of the glass rods 3 near their ends are opposite burners 5 the rods together with their chucks are revolved around the longitudinal axes of the rods by means of a pinion 6 journaled in the wheel 1 and coming into engagement with a pinion 7 when the group of chucks arrives in the position B. The pinion 7 is continuously rotated by a pinion 9 loose on the shaft 8 of the wheel 1. The pinion 6 drives pinions 10 on the chucks. All pinions 10 of a group of chucks mesh with their neighboring pinions.

While the group of rods in the position B is heated by the flames of the burners the attendant removes the finished rods already provided with beads from the chucks. While this is being done the glass rods of the group in the position B have been softened near their top ends. The attendant then again depresses the treadle whereby as will be readily seen from Fig. 3 the upsetting frame 12 occupying the position B is raised. This upsetting frame carries pins 13 in line with the glass rods held in the chucks which are preferably revolved with the same angular velocity and in the same direction as the rods by any suitable gearing. The upsetting frame is raised so far that its pins 13 strike against the bottom ends of the glass rods and force them upward whereby the softened parts near the top end of the rods are upset so as to form beads. When this has been done and the upsetting frame has been moved away from the glass rods the wheels 1 and 11 are turned forward through the distance between two adjacent groups so that the group which had previously occupied the position B now comes into the position C Figs. 1 and 4 in which the chucks and also the pins 13 are revolved as above described with reference to the position B and in which the bottom ends of the glass rods are opposite burners 14 and are heated by the flames of the latter. On next depressing the treadle the upsetting frame may be raised in the same way as described with reference to the position B so that its pins 13 upset the softened bottom ends of the glass rods whereby these ends are formed into beads. Or instead of being directly raised by depressing the treadle the upsetting frame 12 may be raised by the movement of the wheels 1 and 11 caused by depressing the treadle for bringing these wheels from the position C into the position D. For this purpose, a projection 15 is provided on the upsetting frame which passes over a cam surface 16 fixed in the frame of the machine.

In the position D the glass rods do not undergo any further operation but are left to themselves for cooling. The next movement of the wheels 1 and 11 carries the group of chucks from the position D into the position A the finished glass rods are taken out of the chucks by hand and fresh ones inserted, whereupon the series of operations is repeated with these fresh rods.

For correctly limiting the forward movement of the wheels 1 and 11 a spring actuated pawl 17 is provided in the frame of the machine against which strike suitable stops for instance the spokes of one of the wheels, say 11. On depressing the treadle this pawl is brought out of engagement with the above mentioned stop before the wheels begin to move. Instead of being operated directly by the treadle as above indicated the wheels 1 and 11 might be actuated by a weight or spring released on depressing the treadle, such weight being raised or spring being wound up by the pinion 9 or other continuously moving part of the machine while the wheels are at rest, or the arrangement might be such that the treadle only raises the upsetting frame in the position B and throws out of engagement the pawl 17, while the attendant moves the wheels 1 and 11 by hand. In this case the attendant after having depressed the treadle has to turn the wheels by hand; immediately after having started them the attendant must release the treadle in order that the pawl 17 may stop the movement of the wheels in their correct position.

The machine above described permits of manufacturing glass rods for the filaments supporting frames of electric incandescent lamps with great nicety avoiding the risk of breaking or distorting the rods, because the blanks may be inserted with great exactness into the chucks in which they are then safely held.

By arranging the blanks in groups and subjecting all the blanks of a group to the successive operations simultaneously the time required for heating the blanks at different points may be utilized for removing finished blanks and inserting fresh ones and the attendant can select the speed of working at will to suit the conditions existing at any time, without having to adjust any part whatever, whereby great efficiency and working under the most favorable conditions are secured.

Claims:

1. In a machine for producing beads on glass rods the combination of a frame, two intermittently rotating parallel wheels clutched together and journaled in such frame adapted to be brought to different predetermined points successively a plurality of equidistant groups of chucks mounted on one of the said wheels, each of such groups comprising a plurality of individual chucks, each of such chucks being adapted to hold a glass rod with its longitudinal axis normal to the plane of the wheel, upsetting frames mounted on the other wheel opposite the said groups of chucks, means for reciprocating such upsetting frames in a direction normal to the said other wheel, and burners mounted in the said frame facing said predetermined points and adapted to heat parts of the said glass rods.

2. In a machine for producing beads on glass rods the combination of a frame, two intermittently rotating parallel wheels clutched together and journaled in such frame adapted to be brought to different predetermined points successively a plurality of equidistant groups of chucks mounted on one of the said wheels, each of such groups comprising a plurality of individual chucks, each of such chucks being adapted to hold a glass rod with its longitudinal axis normal to the plane of the wheel, upsetting frames mounted on the other wheel opposite the said groups of chucks, means for reciprocating such upsetting frames in a direction normal to the said other wheel, means for revolving the chucks of the groups at the said different points, and burners mounted in the said frame facing said predetermined points and adapted to heat parts of the said glass rods.

3. In a machine for producing beads on glass rods the combination of a frame, two intermittently rotating parallel wheels clutched together and journaled in such frame adapted to be brought to different predetermined points successively a plurality of equidistant groups of chucks mounted on one of the said wheels, each of such groups comprising a plurality of individual chucks, each of such chucks being adapted to hold a glass rod with its longitudinal axis normal to the plane of the wheel, upsetting frames mounted on the other wheel opposite the said groups of chucks, means for reciprocating such upsetting frames in a direction normal to the said other wheel, means for revolving the chucks of the groups at the said different predetermined points such means comprising pinions journaled in the frame and facing the said points, means for driving such pinions, pinions journaled in the wheel carrying the chucks and adapted to engage with the said pinions journaled in the frames, and pinions mounted on the chucks, such pinions of one group of chucks meshing the one with the other, one of the last named pinions of each group of chuck meshing with one of the said pinions journaled in the chuck carrying wheel, and burners mounted in the said frame facing such points and adapted to heat parts of the said glass rods.

In testimony whereof, we affix our signatures, in presence of two witnesses.

JOHANN KREMENEZKY.
JOSEF JELLINEK.

Witnesses:
 ARTHUR CZANMANSKY,
 AUGUST FUGGER.